United States Patent [19]

Omoto et al.

[11] 3,855,202

[45] Dec. 17, 1974

[54] ONE STEP PROCESS FOR THE PRODUCTION OF A MONOESTER OF MACROLIDE ANTIBIOTICS

[75] Inventors: Shoji Omoto, Tokyo; Shigeharu Inoue; Taro Niida, both of Yokohama, all of Japan

[73] Assignee: Meiji Seika Karsha, Ltd., Tokyo, Japan

[22] Filed: June 15, 1972

[21] Appl. No.: 262,967

[52] U.S. Cl. .................... 260/210 AB, 260/210 R
[51] Int. Cl. ............................................ C07c 129/18
[58] Field of Search ....... 260/210 AB, 210 E, 210 R

[56] References Cited
UNITED STATES PATENTS

| | | | |
|---|---|---|---|
| 2,862,921 | 12/1958 | Booth et al. | 260/210 E |
| 2,993,833 | 7/1961 | Stephens | 260/210 E |
| 3,535,309 | 10/1970 | Hata et al. | 260/210 E |

*Primary Examiner*—Johnnie R. Brown
*Attorney, Agent, or Firm*—Larson, Taylor and Hinds

[57] ABSTRACT

A mono-ester of the antibiotic SF-837 substance and leucomycin $A_3$ in which the hydroxyl group at the 10-position of the lactone ring of the molecule has been esterified can simply and effeciently be produced in one step by reacting the free base form of the SF-837 substance or leucomycin $A_3$ with an acyl halide in solution in a selected solvent and in the presence of a selected acid-binding agent, in contrast to the previously known method of producing said mono-ester which needs two-stage reactions, namely the preparation of the di-ester and subsequent partial de-acylation of the di-ester.

5 Claims, No Drawings

ONE STEP PROCESS FOR THE PRODUCTION OF A MONOESTER OF MACROLIDE ANTIBIOTICS

This invention relates to a one-step process for the production of a mono-ester of macrolide antibiotics, particularly a mono-ester of the SF-837 substance or leucomycin $A_3$ which is a new and useful derivative. More particularly, this invention relates to a one-step process for the production of a monacetate or mono-propionate of the SF-837 substance and a mono-acetate or mono-propionate of leucomycin $A_3$.

Leucomycin $A_3$ is a well known antibiotic substance, and the antibiotic SF-837 substance is a macrolide antibiotic substance disclosed in Belgian Pat. No. 745,430 (registered in April, 1970) which may be produced by cultivating a microorganism Streptomyces mycarofaciens (identified as ATCC No. 21454) in a known culture medium under aerobic conditions and recovering said substance from the culture broth. In this Belgian patent it is also disclosed that the SF-837 substance (in the form of the free base) gives the di-acetate, namely the di-acetyl derivative thereof when the SF-837 substance is treated with an excess of acetic anyhydride at room temperature in solution in pyridine.

Previously we succeeded in producing a mono-acetate of the SF-837 substance, that is, a mono-acetyl SF-837 substance by means of a two-step process which comprises treating a solution of the SF-837 substance in pyridine with acetic anhydride to form a di-acetate, namely di-acetyl derivative of the SF-837 substance, and then partially hydrolysing this di-acetyl derivative to liberate therefrom one acetyl group per molecule of the di-acetyl derivative (see Belgian Pat. No. 766710 registered in June 1971). As we demonstrated in this Belgian patent No. 766710, the mono-acetate or mono-acetyl derivative of the SF-837 substance shows considerable advantages in that it gives much less bitter taste on oral administration and remarkably higher curative effect ($CD_{50}$) and lower toxicity, as compared to the free base and the di-acetate of the SF-837 substance.

The SF-837 substance (free base), the mono-acetate and the di-acetate thereof may be represented by a general formula:

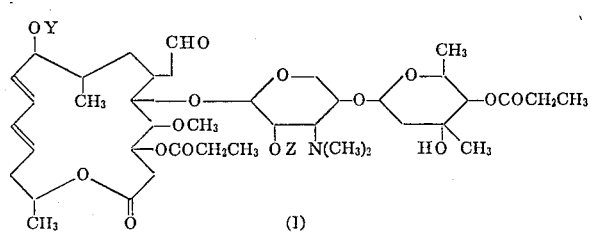

wherein Y and Z each represent a hydrogen atom or an acetyl group. The SF-837 substance (in the form of the free base) corresponds to a compound of the above general formula [I] where both Y and Z are hydrogen atoms; the mono-acetate of the SF-837 substance corresponds to a compound of the above general formula [I] where Y is an acetyl group and Z is hydrogen atom; and the di-acetate of the SF-837 substance corresponds to a compound of the above general formula [I] where both Y and Z are acetyl groups. The SF-837 substance (free base) may chemically be designated as 7-(formylmethyl)-4,10-dihydroxy-5-methoxy-9,16-dimethyl-2-oxacyclohexadeca-11,13-dien-6-yl-3,6-dideoxy-4-O-(2,6-dideoxy-3-C-methyl-$\alpha$-L-ribohexopyranosyl)-3-(dimethylamino)-$\beta$-D-glucopyranoside 4,4-dipropionate (ester).

The above-mentioned two-step process for the production of the mono-acetyl derivative of the SF-837 substance which starts from the free base form of the SF-837 substance is troublesome in that it involves the two stages. Besides, this two-step process is expensive and shows a disadvantage in a commercial practice owing to that it necessitates the use of a large quantity of relatively expensive pyridine as the reaction medium. Moreover, it is practically difficult to apply the reaction of the first step of the above-mentioned two-step process to the preparation of a di-propionate or di-propionyl derivative of the SF-837 substance by treating the free base form of the SF-837 substance with propionic anhydride in stead of acetic anhydride, because the acid anhydrides show a reactivity which decreases rapidly as the number of carbon atoms present in the molecule increases.

An object of the present invention is to provide a process for the production of the mono-acetyl SF-837 substance which can be carried out in one step and much more simply, efficiently and economically than the above-mentioned two-step process of producing the mono-acetyl SF-837 substance. Another objects of the present invention will be apparent from the following descriptions.

As a result of our research, surprisingly we have now found that the mono-acetate or mon-acetyl derivative of the SF-837 substance can immediately be produced from the free base form of the SF-837 substance when an acetyl halide is reacted with the SF-837 substance in solution in a solvent selected from benzene, toluene, ethyl acetate and methyl isobutyl ketone in the presence of an acid-binding agent selected from pyridine and picoline. We have further found that under such reaction conditions, i.e., when benzene, toluene, ethyl acetate or methyl isobutyl ketone is used as the reaction medium and the presence of pyridine or picoline is provided as the acid-binding agent, the SF-837 substance may be converted into a mono-propionate of the SF-837 substance immediately in one step by treating with a propionyl halide, for example, propionyl chloride in stead of the acetyl halide. Moreover, we have found that when leucomycin $A_3$ in place of the SF-837 substance is reacted with an acetyl halide and propionyl halide, there can immediately be produced the mono-acetate and mono-propionate of the leucomycin $A_3$, respectively. In consequence, we have observed that the SF-837 substance and leucomycin $A_3$ may, in general, be converted immediately into the corresponding mono-esters when the SF-837 substance and leucomycin $A_3$ are reacted with various acyl halides as defined hereinafter, in solution in benzene, toluene, ethyl acetate or methyl isobutyl ketone as the reaction medium and in the presence as an acid-binding agent of a quantity of pyridine or picoline. According to the present invention, therefore, there is provided a one-step process for the production of a mono-ester of the SF-837 substance and leucomycin A₃ represented by the general formula:

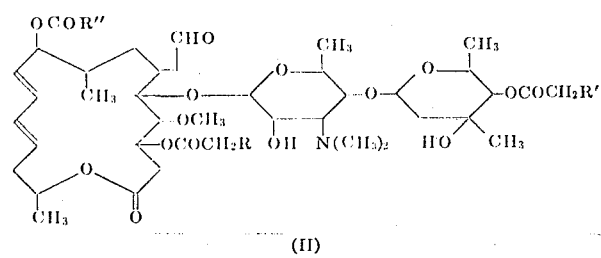

(II)

wherein R is a hydrogen atom or a methyl group, R' is a methyl or isopropyl group, and R'' is an alkyl group of 1 – 4 carbon atoms; a substituted alkyl group of 1 – 4 carbon atoms, particularly a halo-alkyl group of 1 – 4 carbon atoms and a carboxy-alkyl group; an alkenyl group of 1 – 4 carbon atoms or an aromatic group, particularly phenyl group, phenoxymethyl group and cinnamoyl group; or a heterocylic group, particularly pyridyl group, which comprises reacting the SF-837 substance or leucomycin A₃ of the formula:

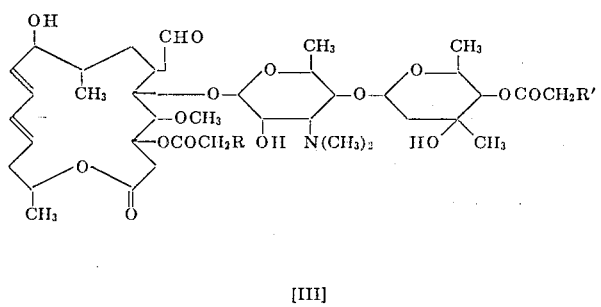

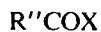

wherein both R and R' are methyl groups in the case of the SF-837 substance, and R is a hydrogen atom and R' is an isopropyl group in the case of the leucomycin A₃, with an acyl halide of the formula

R''COX wherein R'' is as defined above and X is a chlorine or bromine atom in solution in a solvent selected from benzene, toluene, ethyl acetate and methyl isobutyl ketone and in the presence of a quantity of an acidbinding agent selected from pydridine and picoline.

According to an embodiment of the present invention, there is provided a one-step process for the production of the mono-acetate of the SF-837 substance, which comprises reacting the SF-837 substance with an acetyl halide, particularly acetyl chloride or acetyl bromide in solution in a solvent selected from benzene, toluene, ethyl acetate and methyl isobutyl ketone and in the presence of a quantity of an acid-binding agent selected from pyridine and picoline.

It has not been expected that the hydroxyl group present in the 10-position of the lactone ring of the starting SF-837 substance or leucomycin A₃ molecule can selectively be acylated to the corresponding acyloxy group —OCOR'' as in the process of the present invention. This is because there are known facts that the reaction of the SF-837 substance with acetic anhydride in solution in pyridine merely produces the di-acetate of the SF-837 substance (see Belgian patent No. 745430) and that the reaction of leucomycin A₃ with acetyl chloride in solution in acetone in the presence of sodium hydrogen carbonate as the acidbinding agent brings about a selective acetylation of the hydroxyl group in the 2'-position of mycaminose moiety of the leucomycin A₃ molecule, affording a leucomycin A₃ mono-acetate represented by the formula:

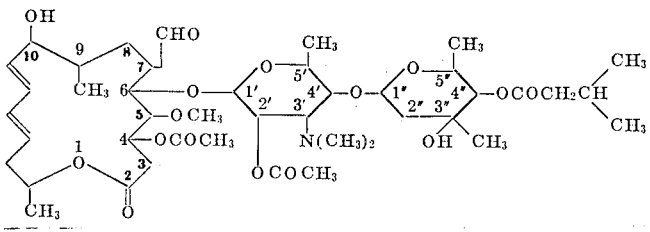

[see articles of Ohomura et al in the "Progress in Antibacterial and Antitumor Chemotherapy" II, page 1043 (1970)]. In view of these known facts, it rather can have never been expected that the selection of the particular natures of the reaction medium and the acid-binding agent in accordance with the present invention permits a site in the SF-837 substance or leucomycin A₃ molecule which undergoes the acylation, to be shited so that the acylation of the hydroxyl group takes place selectively only in the 10-position of the lactone ring of the molecule.

As compared to the two-step process for the production of the mono-acetate of the SF-837 substance as mentioned above, the process of the present invention shows many advantages in that the formation of the mono-acetyl SF-837 substance can take place simply and much more efficiently in the one-stage reaction and can be completed in a shorter reaction time, and in that the quantity of pyridine used can be decreased as pyridine does not serve as the reaction solvent but only as the acid-binding agent which is enough to be present in such a proportion sufficient to bind the whole quantity of hydrogen halide liberated during the reaction. Although it is mentioned in the above that pyridine and picoline the presence of which is provided in the present invention serve as the acid-binding agent, it appears that the pyridine and picoline acts also as a catalyst which promotes the selective acylation of the hydroxyl group in the 10-position of the lactone ring of the starting material. This is very probable because it has been observed from some experiments that when the SF-837 substance is reacted with acetyl chloride in solution in benzene or toluene etc., and in the presence of trimethyl amine, triethyl amine or N-methyl-morpholine as the acid-binding agent in stead of the pyridine or picoline which should be used according to the present invention, there can be produced the di-acetate but not the mono-acetate of the SF-837 substance.

In carrying out the process of the present invention, the reaction temperature may vary in a relatively wide range of 0° to 100° C. However, it is preferred that the process should take place at a temperature of 0° to 30° C. In carrying out the process of the present invention, it is necessary to use the acyl halide in such an amount which is at least stoichiometrically required to acylate the whole amount of the starting SF-837 substance or leucomycin $A_3$ charged. It is preferable, however, that the acyl halide should be used in such an amount of 2 – 10 times the stoichiometrically required amount. Furthermore, it is necessary that pyridine or picoline as the acid-binding agent should be used at least in such an amount which is substantially sufficient to neutralise all the hydrogen halide liberated from the acyl halide during the reaction. It is preferred that pyridine or picoline should be used in a slight excess. Usually it takes a reaction time of 30 minutes to 10 hours to complete the reaction, though the reaction time required depends on the reaction temperature employed. To recover the desired mono-ester product from the reaction mixture, the reaction mixture may be distilled, preferably under a reduced pressure, to remove the reaction solvent therefrom, and the residue comprising the desired mono-ester product may then be washed with water to remove the pyridine or picoline hydrochloride or hydrobromide. In case the pyridine or picoline hydrochloride or hydrobromide which has been formed during the reaction is sparingly soluble in the reaction solvent employed, the amine salt has precipitated in the reaction mixture and may be removed from the reaction mixture by filtration before the mono-ester of the SF-837 substance or leucomycin $A_3$ is separated from the reaction solvent by distillation.

In order to demonstrate that the curative effect of the mono-acetate of the SF-837 substance is remarkably improved over that of the SF-837 substance (free base) and the di-acetate of the SF-837 substance, the following tests were carried out to treat Streptococcus pyogenes infections in mice. Several groups of mice were used for the tests and each group of mice consisted of 10 mice of "ICR-JCL" strain. A suspension of pathogenic bacteria Streptococcus pyogenes Ti-125 Gr-A type I was injected intraperitoneally to the mice each at an inoculum size of 100 times higher than the $LD_{50}$. Suspensions which had been prepared by dispersing different amounts of the monoacetate of the SF-837 substance in an aqueous solution of 2% gum arabic were then orally administered to the infected mice three times, namely at the ends of 30 minutes, 3 hours and 6 hours after the inoculation. The treated mice were observed for 7 days, and then the curative effect was calculated according to the Litchfield-Wilcoxon method. The $CD_{50}$ value of the mono-acetate of the SF-937 substance was estimated to be 79 mg/kg. When tested in the same manner as mentioned above, the SF-837 substance (free base) exhibited a $CD_{50}$ value of 165 mg/kg and the di-acetate of the SF-837 substance exhibited a $CD_{50}$ value of 170 mg/kg in the treatment of Streptococcus pyogenes infections in mice.

In order to demonstrate that various mono-esters of the SF-837 substance as produced according to the present invention exhibit a higher therapeutic activity than the SF-837 substance (free base) in the treatment of bacterial infections, further tests were conducted as follows: Several groups of mice each consisting of 20 mice of "ICR-JCL" strain (male, 4-week-age and averaged body weight of about 20 g) were used for the tests. Staphylococcus aureus 209P was inoculated to and incubated in a culture medium Brain Heart Infusion at 37° C for 20 hours, and the culture broth obtained was then diluted to a volume of five times the original volume. An equal volume of an aqueous solution of 10 percent mucin was admixed with the diluted culture broth to prepare a bacteria suspension containing $25 \times 10^6$ bacteria per 0.5 ml of the suspension. 0.5 ml of this suspension was injected intraperitoneally to each of the mice for infection purpose. Test compounds were each formulated into a suspension of the active compound in an aqueous solution of 2 percent gum arabic. Immediately after the infection, the suspension of the test compound was orally administered to each of the infected mice at a dosage of 350 mg/kg. The infected mice so treated were the observed for 7 days, and per cent of the survival was estimated. The results of tests are shown in a Table below. The control mice (untreated) were all died in 2 days after the infection.

Table

| Test compound | Survival (%) |
|---|---|
| SF-837 substance (free base)(comparative) | 50 |
| The mono-acetate of SF-837 substance | 100 |
| The mono-propionate of SF-837 substance | 95 |
| The mono-isobutylate of SF-837 substance | 55 |
| The mono-succinate of SF-837 substance | 80 |
| The mono-isonicotinate of SF-837 substance | 90 |
| Control (untreated) | 0 |

When the mono-ester of the SF-837 substance or leucomycin $A_3$ is used for therapeutic purpose in practice, it may be made up in a conventional pharmaceutical manner into various formulations suitable for oral administration such as tablets, capsules, pulver and granules.

The present invention is now illustrated with reference to the following Examples.

Example 1

810 mg (1 milli-mol) of the SF-837 substance was dissolved in 40 ml of toluene, and to the resulting solution were successively added 0.35 ml (4.3 millimol) of pyridine and 0.30 ml (4.2 milli-mol) of acetyl chloride. The mixture was stirred at ambient temperature for 1 hour. The reaction mixture was then assayed by means of a thin layer chromatography to find out that the whole amount of the starting material had been converted into the mono-acetate. To the reaction mixture were added 0.5 ml of tri-ethyl amine and 40 ml of ethyl acetate, and the admixture was then extracted 3 times with 40 ml of water. The organic solvent phase was subsequently dried over anhydrous sodium sulfate and evaporated to dryness, affording 850 mg of the mono-acetate of the SF-837 substance in the form of a powder which melted at 118° – 120° C. When this powder was recrystallised from a small volume of acetone, there was obtained the mono-acetate of the SF-837 substance in the form of colorless needles of a melting point of 121° – 122° C.

EXAMPLE 2

400 mg (0.5 milli-mol) of the SF-837 substance was dissolved in 40 ml of benzene, and to the resulting solution were successively added 0.4 ml of pyridine and 0.4 ml of propionyl chloride. The mixture was agitated at ambient temperature for 1 hour. The reaction mixture was then processed in the same manner as in Example 1 to give 400 mg of the mono-propionate of the SF-837 substance in the form of a powder which melted at 115° – 123° C.

EXAMPLE 3

400 mg of leucomycin $A_3$ was dissolved in 40 ml of benzene, and to the resulting solution were added successively 0.35 ml of pyridine and 0.3 ml of acetyl chloride. The mixture was then agitated at ambient temperature for 1 hour.

The reaction mixture was subsequently processed in the same manner as in Example 1 to give 400 mg of the mono-acetate of leucomycin $A_3$ in the form of a powder. Recrystallisation of this powder from 80 percent aqueous methanol gave crystals of a melting point of 128° – 131° C.

EXAMPLE 4

810 mg (about 1 milli-mol) of the SF-837 substance was dissolved in 30 ml of ethyl acetate, and to the resulting solution were added successively 0.4 ml of picoline and 0.30 ml of acetyl chloride. The mixture was agitated at ambient temperature for 1 hour. The reaction mixture was then processed in the same manner as in Example 1 to give 840 mg of the mono-acetate of the SF-837 substance in the form of an amorphous powder which melted at 117° – 120° C.

EXAMPLE 5

810 mg of the SF-837 substance was dissolved in 30 ml of methyl isobutyl ketone, and to the resulting solution were added successively 0.4 ml of pyridine and 370 mg of acetyl bromide. The mixture was agitated at ambient temperature for 1 hour. The reaction mixture was then processed in the same manner as in Example 1 to give 860 mg of the mono-acetate of the SF-837 substance in the form of an amorphous powder which melted at 118° – 120° C.

EXAMPLE 6

The procedure of Example 2 was repeated using phenylacetyl chloride in place of the propionyl chloride. Mono-phenylacetate of the SF-837 substance was obtained in the form of a crystalline powder which melted at 205° – 210° C. Yield 95 percent.

EXAMPLE 7

The procedure of Example 2 was repeated except that the reaction was carried out at 30° C for 3 days using trimethylacetyl chloride in place of the propionyl chloride. Mono-trimethylacetate of the SF-837 substance was yielded in the form of an amorphous powder which melted at 113° – 118° C. Yield 25 percent.

EXAMPLE 8

The procedure of Example 2 was repeated using benzoyl chloride in stead of the propionyl chloride. Mono-benzoate of the SF-837 substance was given in the form of an amorphous powder which melted at 135° – 138° C. Yield 85 percent.

EXAMPLE 9

The process of Example 2 was followed by replacing the propionyl chloride by succinyl chloride. Monosuccinate of the SF-837 substance was yielded in the form of an amorphous powder which melted at 73° – 75° C. Yield 90 percent.

EXAMPLE 10

The proceses of Example 2 was followed by replacing the propionyl chloride by isonicotinyl chloride, except that the reaction was carried out at ambient temperature for 15 hours. Mono-isonicotinate of the SF-837 substance was afforded in the form of an amorphous powder which melted at 132° – 135° C. Yield 90 percent.

EXAMPLE 11

The process of Example 2 was followed by using phenoxyacetyl chloride in stead of the propionyl chloride. Mono-phenoxyacetate of the SF-837 substance was afforded in the form of an amorphous powder which melted at 88° – 93° C. Yield 90 percent.

EXAMPLE 12

The process of Example 2 was followed by using crotonyl chloride in stead of the propionyl chloride. Mono-crotonate of the SF-837 substance was obtained in the form of an amorphous powder which melted at 115° – 118° C. Yield 95 percent.

EXAMPLE 13

The process of Example 2 was repeated using $\alpha$-bromopropionyl bromide in stead of the propionyl chloride. Mono-$\alpha$-bromopropionate of the SF-837 substance was obtained in the form of an amorphous powder which melted at 132° – 138° C. Yield 88 percent.

EXAMPLE 14

The process of Example 2 was repeated using cinnamoyl chloride in place of the propionyl chloride. Mono-cinnamate of the SF-837 substance was obtained in the form of an amorphous powder which melted at 90° – 97° C. Yield 90 percent.

EXAMPLE 15

400 mg of leucomycin $A_3$ dissolved in 40 ml of benzene, and to the resulting solution were added successively 0.35 ml of pyridine and 0.4 ml of propionyl chloride. The mixture was subjected to the acylation at ambient temperature for 1 hour. The reaction mixture was then processed in the same manner as in Example 1 to give 430 mg of mono-propionate of the leucomycin $A_3$ in the form of an amorphous powder which melted at 125° – 130° C.

What we claim is:

1. A process for the production of a mono-ester of the SF-837 substance of the formula:

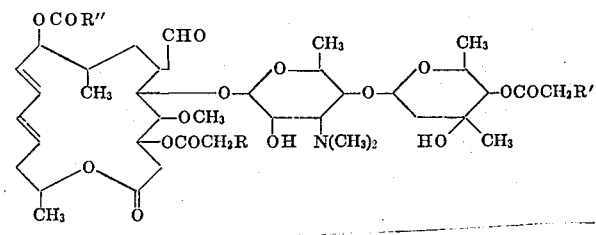

wherein R is a methyl group, R' is a methyl group, and R" is an alkyl goup of 1 – 4 carbon atoms; an alkyl group of 1 – 4 carbon atoms substituted with phenyl, trimethyl, carboxyl, phenoxy or bromo; an alkenyl group of 1 – 4 carbon atoms; styryl; phenyl or pyridyl group, which comprises reacting the SF-837 substance of the formula:

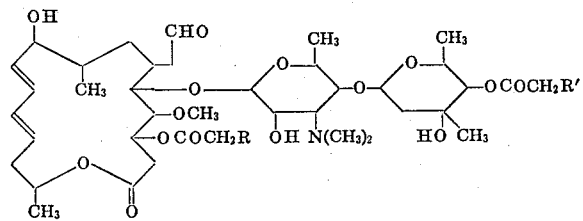

wherein both R and R' are methyl groups with an acyl halide of the formula

R"COX wherein R" is as defined above and X is a chlorine or bromine atom in solution in a solvent selected from benzene, toluene, ethyl acetate and methyl isobutyl ketone and in the presence of a quantity of an acid-binding agent selected from pyridine and picoline.

2. A process as claimed in claim 1 in which the monoacetate of the SF-837 substance is produced by reacting the SF-837 substance with acetyl chloride or bromide in solution in a solvent selected from benzene, toluene, ethyl acetate and methyl isobutyl ketone and in the presence of a quantity of an acid-binding agent selected from pyridine and picoline.

3. A process as claimed in claim 1 in which the monopropionate of the SF-837 substance is produced by reacting the SF-837 substance with propionyl chloride or bromide in solution in a solvent selected from benzene, toluene, ethyl acetate and methyl isobutyl ketone and in the presence of a quantity of an acid-binding agent selected from pyridine and picoline.

4. A process as claimed in claim 1 in which the reaction of the SF-837 substance is carried out at a temperature of 0° to 30° C.

5. A process as claimed in claim 1 in which pyridine or picoline as the acid-binding agent is present in such an amount which is substantially sufficient to neutralize all the hydrogen halide liberated during the reaction.

* * * * *